US012804187B2

(12) United States Patent
Zhang

(10) Patent No.: US 12,804,187 B2
(45) Date of Patent: Nov. 17, 2026

(54) MOTION ESTIMATION METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Xu Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 77 days.

(21) Appl. No.: 18/999,072

(22) Filed: Dec. 23, 2024

(65) Prior Publication Data

US 2025/0168389 A1 May 22, 2025

(30) Foreign Application Priority Data

Oct. 30, 2024 (CN) ......................... 202411533917.8

(51) Int. Cl.
*H04N 19/513* (2014.01)
*H04N 19/139* (2014.01)

(52) U.S. Cl.
CPC ......... *H04N 19/513* (2014.11); *H04N 19/139* (2014.11)

(58) Field of Classification Search
CPC .... H04N 19/513; H04N 19/139; H04N 19/56; H04N 19/533; H04N 19/51; H04N 19/70
(Continued)

(56) References Cited

U.S. PATENT DOCUMENTS

2010/0002776 A1* 1/2010 Lee ........................ H04N 19/58 375/E7.027
2014/0029676 A1* 1/2014 Abiezzi .................. H04N 19/46 375/E7.026

(Continued)

FOREIGN PATENT DOCUMENTS

CN 107645663 A 1/2018
CN 112203095 A 1/2021

(Continued)

OTHER PUBLICATIONS

Registration Procedure Notification of Chinese patent application No. 202411533917.8 dated Sep. 1, 2025, 10 pages.

(Continued)

*Primary Examiner* — Asmamaw G Tarko
(74) *Attorney, Agent, or Firm* — BROOKS KUSHMAN P.C.

(57) ABSTRACT

A motion estimation method, apparatus, electronic device, storage medium, and computer program product are disclosed, which relates to the field of artificial intelligence, specifically cloud storage, cloud computing, video encoding. A method for motion estimation comprises: determining candidate search spaces and candidate search starting points based on a lookahead motion vector and a predicted search starting point of a current block; determining a target search starting point from the candidate search starting points and determining a target search space from the candidate search spaces; performing a search based on the target search starting point and the target search space to obtain an initial motion estimation result for the current block; obtaining a target motion estimation result for the current block based on the initial motion estimation result.

14 Claims, 6 Drawing Sheets

(58) Field of Classification Search
USPC .................................................... 375/240.16
See application file for complete search history.

(56) References Cited

U.S. PATENT DOCUMENTS

| | | | | |
|---|---|---|---|---|
| 2014/0205013 | A1* | 7/2014 | Kim | H04N 19/139 375/240.16 |
| 2015/0110196 | A1* | 4/2015 | Kadono | H04N 19/43 375/240.16 |
| 2020/0137415 | A1* | 4/2020 | Esenlik | H04N 19/521 |
| 2021/0409754 | A1* | 12/2021 | Sethuraman | H04N 19/533 |
| 2025/0233982 | A1* | 7/2025 | Chen | H04N 19/139 |
| 2025/0240449 | A1* | 7/2025 | Chen | H04N 19/577 |
| 2025/0240450 | A1* | 7/2025 | Chen | H04N 19/52 |
| 2025/0286992 | A1* | 9/2025 | Chen | H04N 19/176 |

FOREIGN PATENT DOCUMENTS

| | | | |
|---|---|---|---|
| CN | 112738529 | A | 4/2021 |
| CN | 113382258 | A | 9/2021 |
| IN | 201947054715 | A | 1/2020 |
| WO | 2022218299 | A1 | 10/2022 |
| WO | 2024216415 | A1 | 10/2024 |

OTHER PUBLICATIONS

Deng et al., Fast Motion and Disparity Estimation of Multi-view Video Coding, Journal of Beijing University of Technology, vol. 37, No. 5, May 2011, with English Abstract, 15 pages.

* cited by examiner

MOTION ESTIMATION METHOD, ELECTRONIC DEVICE, AND STORAGE MEDIUM

CROSS-REFERENCE TO RELATED APPLICATION

The present application claims the priority and benefit of Chinese Patent Application No. 202411533917.8, filed on Oct. 30, 2024, entitled "MOTION ESTIMATION METHOD AND APPARATUS, ELECTRONIC DEVICE, STORAGE MEDIUM, AND PRODUCT". The disclosure of the above application is incorporated herein by reference in its entirety.

TECHNICAL FIELD

The present disclosure relates to the field of artificial intelligence, specifically cloud storage, cloud computing, video encoding, and other technical fields. More particularly, the present disclosure relates to a motion estimation method, apparatus, electronic device, storage medium, and computer program product.

BACKGROUND

High Efficiency Video Coding (HEVC) is a video coding standard that can effectively improve coding efficiency under the same video quality, thereby encoding videos at the lowest possible bitrate while maintaining a certain level of video quality.

In HEVC, the inter-frame prediction coding is an important video compression technique, which achieves efficient compression by obtaining the difference between the current frame and the reference frame through motion estimation and encoding the difference portion.

Motion estimation is performed on a pixel block basis to search for the block in the search space of the reference frame that best matches the current block in the current frame, and the motion estimation result is obtained based on the matching results.

SUMMARY

The present disclosure provides a motion estimation method, an electronic device, and a storage medium.

According to one aspect of the present disclosure, a method for motion estimation is provided, including: determining candidate search spaces and candidate search starting points based on a lookahead motion vector and a predicted search starting point of a current block; determining a target search starting point from the candidate search starting points and determining a target search space from the candidate search spaces; performing a search based on the target search starting point and the target search space to obtain an initial motion estimation result for the current block; obtaining a target motion estimation result for the current block based on the initial motion estimation result.

According to another aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a method for motion estimation, wherein the method for motion estimation includes: determining candidate search spaces and candidate search starting points based on a lookahead motion vector and a predicted search starting point of a current block; determining a target search starting point from the candidate search starting points and determining a target search space from the candidate search spaces; performing a search based on the target search starting point and the target search space to obtain an initial motion estimation result for the current block; obtaining a target motion estimation result for the current block based on the initial motion estimation result.

According to another aspect of the present disclosure, there is provided a non-transitory computer readable storage medium with computer instructions stored thereon, wherein the computer instructions are used for causing a method for motion estimation, wherein the method for motion estimation comprises: determining candidate search spaces and candidate search starting points based on a lookahead motion vector and a predicted search starting point of a current block; determining a target search starting point from the candidate search starting points and determining a target search space from the candidate search spaces; performing a search based on the target search starting point and the target search space to obtain an initial motion estimation result for the current block; obtaining a target motion estimation result for the current block based on the initial motion estimation result.

It should be understood that the content described in this section is not intended to identify key or essential features of the embodiments of the present disclosure, nor is it intended to limit the scope of the present disclosure. Other features of the present disclosure will become apparent from the following description.

BRIEF DESCRIPTION OF THE DRAWINGS

The drawings are used for a better understanding of this solution and do not constitute limitations of the present disclosure. In the drawings.

DETAILED DESCRIPTION

Figure 1:
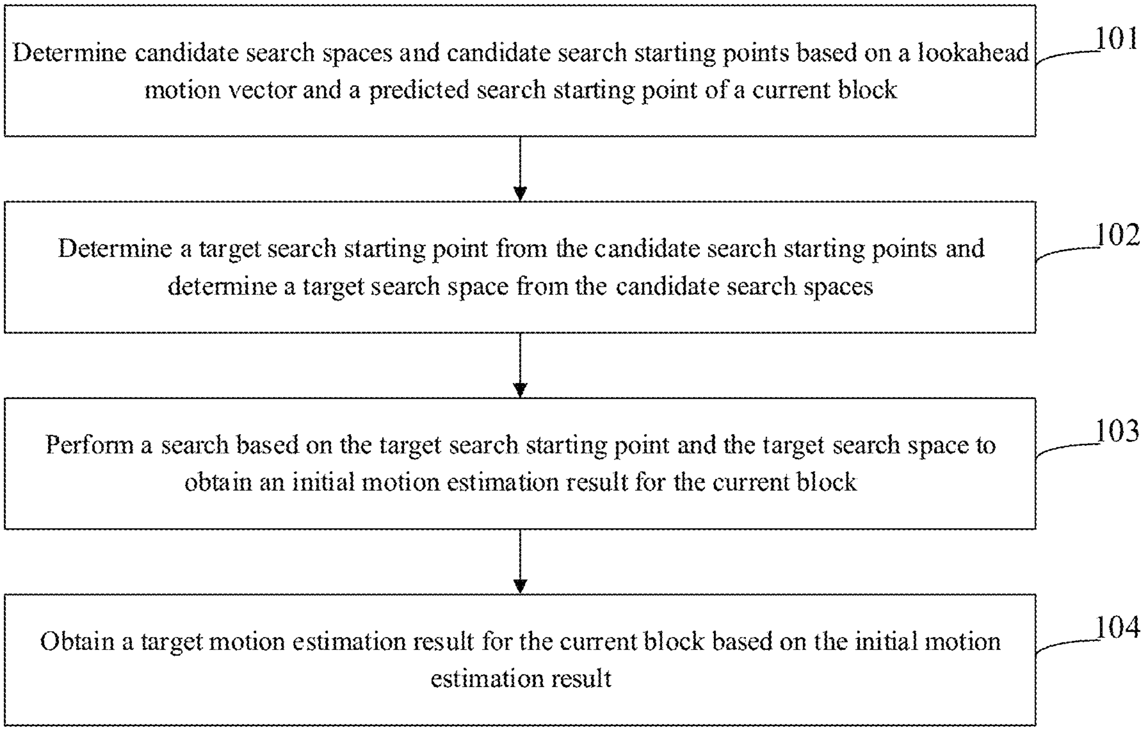
FIG. 1 is a schematic diagram according to the first embodiment of the present disclosure.

The following describes exemplary embodiments of the present disclosure in conjunction with the drawings, including various details of the disclosed embodiments to facilitate understanding. These should be considered merely exemplary. Therefore, those skilled in the art should recognize that various changes and modifications can be made to the described embodiments without departing from the scope and spirit of the present disclosure. Similarly, descriptions of known functions and structures are omitted for clarity and conciseness.

The motion estimation process mainly includes: dividing the images of the current frame and the reference frame respectively into several pixel blocks of the same size; selecting pixel blocks that require motion estimation according to a certain rule, such as selecting blocks containing more texture or motion information; for each selected pixel block in the current frame (referred to as the current block), searching for the most matching pixel block (referred to as the matching block) within the search space of the reference frame; calculating the relative position coordinates (referred to as the Motion Vector (MV)) between the matching block and the current block. Therefore, through motion estimation, a motion vector can be obtained, which reflects the direction and distance of the matching block relative to the current block.

In addition, the cost corresponding to the MV can also be calculated, and the MV and its cost can be used as the motion estimation result.

The cost mentioned above can specifically be the rate-distortion cost. The rate-distortion cost takes into account both the number of encoding bits and the degree of distortion. The number of encoding bits refers to the number of bits required to encode the motion vector and residual information, while the degree of distortion is typically calculated using a certain error metric, such as mean square error or peak signal-to-noise ratio, which represents the difference between the reconstructed image and the original image.

The size of the search space is determined by a search range value, which can be represented by the number of pixels from the center point to the boundary of the search space. For example, if the search range value is denoted by d (a positive integer), the search space is a square region with the mapping point from the current block to the reference frame as the center point and having a side length of 2d pixels.

In the related art, the search range value is usually set to a fixed value. However, if the search range value is set too small, the corresponding search space will be small, and it may be impossible to find the matching block with the best matching effect for the current block. If the search range value is set too large, it will result in a longer search time for the matching block, reducing the encoding efficiency.

In video encoding scenarios, the process can be divided into a lookahead stage and an encoding stage. The lookahead stage mainly determines the encoding parameters, and the encoding stage performs the specific encoding operations based on the encoding parameters, such as inter-frame prediction encoding as mentioned above.

Regarding the lookahead stage, the encoding parameters of the current frame, such as frame type, block partitioning strategy, and encoding mode, can be determined by analyzing the current frame and the reference frame. For example, if there is a significant difference between the reference frame and the current frame, an I-frame can be selected for encoding to provide better random access points and higher image quality. Another example is that if the motion in a certain area of the reference frame is complex, a smaller block partitioning and a more complex encoding mode can be used for the corresponding area in the current frame to improve encoding efficiency and accuracy.

In video encoding, there are three common frame types:

I-frame (Intra-coded frame): Also known as a key frame, it is an independently encoded frame that does not rely on other frames for encoding.

P-frame (Predictive-coded frame): It relies on the previous I-frame or P-frame for encoding, which uses motion estimation and motion compensation techniques to predict the current frame using information from the previous frame.

B-frame (Bidirectionally predictive-coded frame): It relies on both the previous frame and the next frame for encoding, which uses bidirectional motion estimation and motion compensation techniques to predict the current frame using reference frames from both directions.

In the lookahead stage, a spatial downsampling can also be performed on the current frame and the reference frame. The spatial downsampling reduces the resolution or size of the image, i.e., decreases the number of pixels in the image. Motion estimation is performed based on the downsampled image to obtain an initial motion estimation result, which can be represented by "lmv".

In the related art, the search range value for the search space in the encoding stage is usually set to a fixed value, which leads to insufficient accuracy and thus affects the accuracy of the motion estimation result.

In the embodiments of the present disclosure, the search range value for the encoding stage is determined based on the "lmv", thereby improving the accuracy of the search space and enhancing the effect of motion estimation.

In order to improve the performance of motion estimation, the present disclosure provides the following embodiments.

FIG. 1 is a schematic diagram according to the first embodiment of the present disclosure. The present embodiment provides a method for motion estimation, as shown in FIG. 1, which includes the following steps of:

101. Determining candidate search spaces and candidate search starting points based on a lookahead motion vector and a predicted search starting point of a current block.

102. Determining a target search starting point from the candidate search starting points and determining a target search space from the candidate search spaces.

103. Performing a search based on the target search starting point and the target search space to obtain an initial motion estimation result of the current block.

104. Obtaining a target motion estimation result for the current block based on the initial motion estimation result.

In video encoding scenarios, the current block refers to the pixel block currently encoded in the video.

The video encoding process can be divided into a lookahead stage and an encoding stage. Both the lookahead stage and the encoding stage can perform motion estimation. The motion vector obtained by performing motion estimation in the lookahead stage is referred to as the lookahead motion vector, which can be represented by "lmv".

For the current block, a candidate motion vector (candidate MV) can be obtained, and the position point obtained based on the candidate MV is referred to as the predicted search starting point, which can be represented by "mvp".

After obtaining the "lmv" and "mvp" of the current block, the candidate search space and the candidate search starting point can be determined based on the "lmv" and "mvp".

There are multiple candidate search spaces and the candidate search starting points. Subsequently, a candidate search space can be determined from the multiple candidate search spaces as the target search space, and a candidate search starting point can be determined from the multiple candidate search starting points as the target search starting point.

After obtaining the target search space and the target search starting point, a search is performed based on the target search space and the target search starting point to obtain the initial motion estimation result. Specifically, starting from the target search starting point, a search is performed in the target search space for a matching block corresponding to the current block. The relative position coordinates between the matching block and the current block are calculated, which can be referred to as the initial motion vector (initial mv). Subsequently, the cost of the initial MV can be obtained, and the initial mv and its cost are used as the initial motion estimation result.

After obtaining the initial motion estimation result, the initial motion estimation result can be used as the target motion estimation result. Alternatively, further processing can be performed based on the initial motion estimation result to obtain the target motion estimation result. For example, based on the initial motion estimation result, the search starting point and the search space can be re-determined, and a new search can be performed based on the new search starting point and the new search space to obtain a new matching block. The target motion estimation result can be obtained based on the relative position coordinates of the new matching block and the current block.

In the present embodiment, the candidate search space and the candidate search starting point are determined based on the lookahead motion vector and the predicted search starting point. The target search starting point is determined from the candidate search starting points, and the target search space is determined from the candidate search spaces. In this way, the lookahead motion vector is referenced during the motion estimation process, which improves the accuracy of the target search space and the target search starting point, and enhances the effects of motion estimation accordingly.

Figure 2:
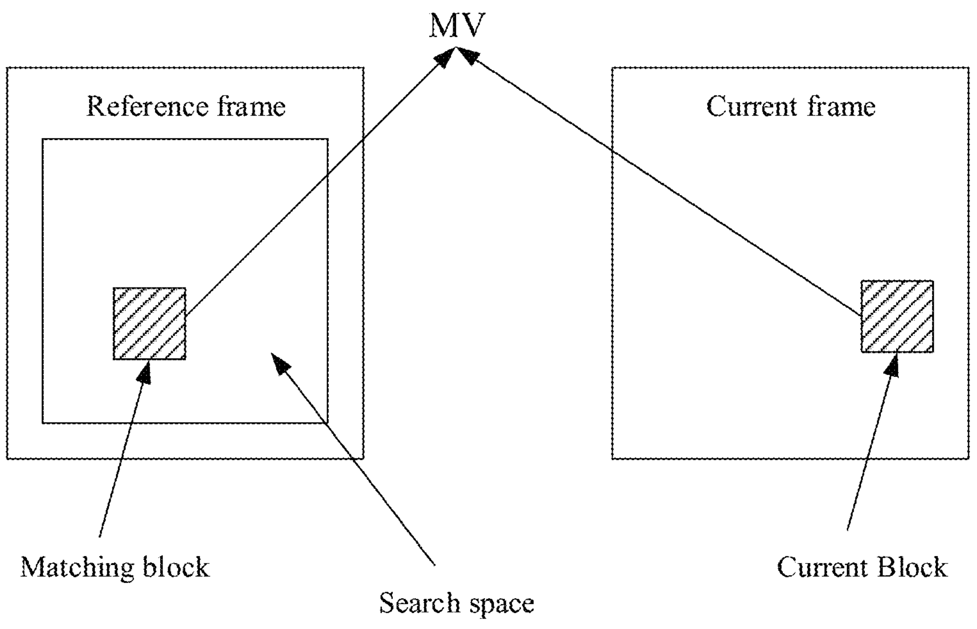
FIG. 2 is a schematic diagram of an application scenario for implementing the embodiments of the present disclosure.

In order to better understand the present disclosure, the application scenarios involved in the present disclosure are described as follows:

FIG. 2 is a schematic diagram of the application scenario for implementing the embodiments of the present disclosure.

In video encoding scenarios, the current frame is the image frame to be encoded in the video, and the reference frame is the frame referenced for encoding. Depending on the encoding mode, the reference frame can be a forward frame and/or a backward frame relative to the current frame. In motion estimation, encoding is typically performed on a pixel block basis. To achieve this, the current frame and the reference frame can be divided into multiple pixel blocks. The pixel block currently encoded in the current frame is referred to as the current block, and the pixel block in the reference frame that best matches the current block is referred to as the matching block.

As shown in FIG. 2, for the current block, a motion vector (MV) can be obtained through the motion estimation process, where MV is the relative position coordinate between the matching block and the current block. In addition, the cost corresponding to the MV can be obtained, and the MV and its cost are used as the motion estimation result for the current block.

The matching block is a pixel block in the reference frame, which is determined by searching in the search space.

The size of the search space can be characterized by the search range value. The larger the search range value, the larger the search space, allowing for a more accurate search for the matching block. However, due to the large search space, the time required for the search increases. The smaller the search range value, the smaller the search space, and the shorter the time consumption. However, due to the limited search range, it affects the accuracy of matching blocks.

In order to improve the accuracy of the search space, in the present embodiment, a candidate search space can be obtained first, and then a target search space can be determined in the candidate search space, and then the search can be conducted in the target search space.

Figure 3:
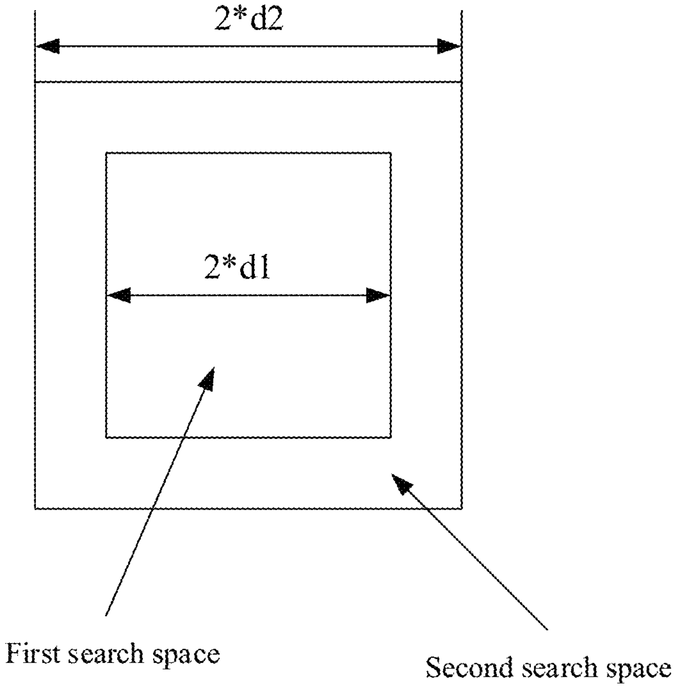
FIG. 3 is a schematic diagram of the candidate search space provided according to the embodiments of the present disclosure.

FIG. 3 is a schematic diagram of the candidate search space provided according to the embodiments of the present disclosure.

As shown in FIG. 3, in the embodiment of the present disclosure, the candidate search space includes a first search space and a second search space. The search range value of the first search space is denoted by "d1", and the search range value of the second search space is denoted by "d2". Therefore, the first search space is a square region with a side length of "2*d1", and the second search space is a square region with a side length of "2*d2".

The two candidate search spaces (the first search space and the second search space) are determined based on the lookahead motion vector and the predicted search starting point.

In video encoding scenarios, the process can be divided into a lookahead stage and an encoding stage. The motion vector obtained in the lookahead stage is referred to as the lookahead motion vector, which can be represented by "lmv".

Specifically, in the lookahead stage, spatial downsampling can be performed on the current frame and the reference frame, and motion estimation is performed on the downsampled current frame and reference frame to obtain the "lmv".

For the current block, the motion vectors of the neighboring blocks that have already been encoded can be used as the candidate motion vectors for the current block. The neighboring blocks can include spatial neighboring blocks and/or temporal neighboring blocks. Taking spatial neighboring blocks as an example, they can specifically include the block above, the block to the left, the block to the upper right, etc.

After obtaining the candidate motion vectors for the current block, the predicted search starting point can be determined based on the candidate motion vectors, which is denoted by "mvp". For example, one of the candidate motion vectors can be selected, such as the one with the highest frequency of occurrence or the best encoding effect, and the position point corresponding to the selected candidate motion vector is used as the predicted search starting point. Alternatively, the mean value of the candidate motion vectors can be calculated, and the position point corresponding to the mean value is used as the predicted search starting point. For example, if one of the selected candidate motion vectors is (4, −3) and the x-axis is positive to the right and the y-axis is positive to the bottom, then in the reference frame, the position point where the mapping position of the current block is horizontally shifted to the right by 4 pixels and upward by 3 pixels is used as the starting point for the predicted search.

After obtaining the lookahead motion vector "lmv" and the predicted search starting point "mvp", the candidate search space is determined based on these two pieces of information.

The first search space is determined based on the lookahead motion vector and the predicted search starting point, and the second search space is determined based on the lookahead motion vector and the first search space.

The search range value of the first search space is referred to as the first search range value, denoted by "d1", and the search range value of the second search space is referred to as the second search range value, denoted by "d2".

In some cases, "d1=d", while in other cases, "d1=d0", where "d0" is a preset initial search range value, and "d" is the distance between the lookahead motion vector "lmv" and the vector corresponding to the predicted search starting point "mvp". The specific situation is determined based on "d".

In some cases, "d2=d1*k", where "k" is a preset multiple greater than 1, while in other cases, "d2=d1". The specific situation is determined based on the corresponding length of the lookahead motion vector "lmv".

In the present embodiment, the first search space is determined based on the lookahead motion vector and the predicted search starting point, and the second search space is determined based on the first search space and the lookahead motion vector. Multiple candidate search spaces can be obtained, and an accurate target search space can be determined based on the candidate search spaces, thereby improving motion estimation performance.

Specifically, if the distance between the lookahead motion vector and the vector corresponding to the predicted search starting point is greater than a first length threshold and less than or equal to a maximum range threshold, the distance is used as the first search range value. The first length threshold is determined based on a preset initial search range value. If the distance is less than or equal to the first length threshold, the initial search range value is used as the first search range value. The search space corresponding to the first search range value is used as the first search space.

The initial search range value is denoted by "d0", which is a preset value.

For the first search range value, the formula is expressed as follows:

$$d1 = \begin{cases} d & \text{if } L1 < d \le L_{max} \\ d0 & \text{if } d \le L1 \end{cases}$$

Where:

"d1" is the first search range value;

"d0" is the preset initial range value;

"L1" is the first length threshold, determined based on the initial search range value, e.g., L1=k1*d0, where "k1" is a preset ratio greater than 1.

"$L_{max}$" is the maximum range threshold. In video encoding, assuming that the image size is represented by "L*W" (length*width), "$L_{max}$" is the minimum value between "L" and "W".

"d" is the distance between the lookahead motion vector "lmv" and the vector corresponding to the predicted search starting point "mvp", which is the distance between the vectors. For example, if "lmv=(3, 2)" and the vector corresponding to "mvp" is "(4, −3)", the distance therebetween can be expressed as:

$$d = \sqrt{((3-4)^2 + (2-(-3))^2)}$$

Based on the above formula, the first search range value "d1" can be obtained, and the first search space can be determined accordingly.

For the second search space:

If the length corresponding to the lookahead motion vector is greater than a second length threshold, the preset multiple of the first search range value of the first search space is used as the second search range value. The second length threshold is determined based on the first search range value. If the length corresponding to the lookahead motion vector is less than or equal to the second length threshold, the first search range value is used as the second search range value. The search space corresponding to the second search range value is used as the second search space.

The formula is expressed as follows:

$$d2 = \begin{cases} d1 * k & \text{if } |lmv| > L2 \\ d1 & \text{if } |lmv| \le L2 \end{cases}$$

Where:

"d2" is the second search range value.

"d1" is the first search range value.

"k" is a preset multiple greater than 1, with the maximum value determined based on the video resolution to ensure that the second search range value does not exceed the video resolution.

"L2" is the second length threshold, determined based on the first search range value "d1", e.g., L2=k2*d1, where "k2" is a preset ratio greater than 1.

"|lmv|" is the length corresponding to the lookahead motion vector, which can be represented by the distance between the position point corresponding to the lookahead motion vector and the coordinate origin, or by the absolute value of the position coordinate of the lookahead motion vector itself. For example, the lookahead motion vector can be expressed as:

$$lmv = (x, y)$$

$$|lmv| = \sqrt{x^2 + y^2}; \text{ or } |lmv| = \max(|x|, |y|)$$

where "| |" represents the absolute value, and "max( )" represents the maximum value.

Based on the above formula, the second search range value "d2" can be obtained, and the second search space can be determined accordingly.

In additional, candidate search starting points can be determined based on the lookahead motion vector and the predicted search starting point.

The candidate search starting points can include: a predicted search starting point and an optimal search starting point, wherein the optimal search starting point is the position point corresponding to the optimal motion vector, and the optimal motion vector is determined based on the lookahead motion vector and the candidate motion vector.

For example, the candidate motion vectors are denoted by "mv1"~"mvn", and the lookahead motion vector is denoted by "lmv". After obtaining these motion vectors, the cost of each motion vector is calculated, and the motion vector with the smallest cost is selected as the optimal motion vector, denoted by "mv*". The position point corresponding to "mv*" is used as the optimal search starting point, denoted by "mvq". Therefore, the candidate search starting points include: "mvp" and "mvq".

In the present embodiment, the predicted search starting point and the position point corresponding to the optimal motion vector are used as the candidate search starting points. In the subsequent process, a suitable starting point can be selected as the target search starting point according to the specific situation, thereby improving the accuracy of the target search starting point and enhancing the accuracy of motion estimation.

After obtaining the candidate search space and the candidate search starting point, the target search space can be determined from the candidate search space, and the target search starting point can be determined from the candidate search starting points. Subsequently, the target motion estimation result can be obtained.

In some embodiments, if the cost of the optimal motion vector is greater than a preset first cost threshold, the predicted search starting point is used as the target search starting point, and the second search space is used as the target search space. Correspondingly, the initial motion estimation result obtained based on the target search starting point and the target search space is used as the target motion estimation result for the current block.

Specifically, assuming that the optimal motion vector is denoted by "mv*", its cost is denoted by "mv*_cost", and the first cost threshold is denoted by "cost1", then:

If "mv*_cost>cost1", the target search starting point is "mvp", and the target search space is the second search space with a search range value of "d2". In this case, the search is performed with "mvp" as the starting point within the search space with a search range value of "d2".

After performing the search, the matching block of the current block is obtained. Assuming that the relative position coordinates between the matching block and the current block are denoted by "mv1", and the corresponding cost is denoted by "mv1_cost", both the initial motion estimation result and the target motion estimation result include: "mv1" and "mv1_cost".

In some embodiments, if the cost of the optimal motion vector is less than or equal to the preset first cost threshold, the optimal search starting point is used as the target search starting point, and the first search space is used as the target search space.

Furthermore, the initial motion estimation result includes the cost of the initial motion vector.

If the cost of the initial motion vector is less than or equal to a preset second cost threshold, the initial motion estimation result is used as the target motion estimation result.

Specifically, assuming the optimal motion vector is denoted by "mv*", its cost is denoted by "mv*_cost", and the first cost threshold is denoted by "cost1", then:

If "mv*_cost<=cost1", the target search starting point is "mvq", and the target search space is the first search space with a search range value of "d1". In this case, the search is performed with "mvq" as the starting point within the search space with a search range value of "d1".

After performing the search, the matching block of the current block is obtained. Assuming the relative position coordinates between the matching block and the current block are denoted by "mv2", and the corresponding cost is denoted by "mv2_cost", the initial motion estimation result includes: "mv2" and "mv2_cost".

Assuming that the second cost threshold is denoted by "cost2", if "mv2_cost<=cost2",the target motion estimation result is the same as the initial motion estimation result, i.e., the target motion estimation result includes: "mv2" and "mv2_cost".

In some embodiments, if the cost of the initial motion vector is greater than the preset second cost threshold, a search is performed based on the predicted search starting point and the second search space to obtain an updated motion estimation result. The target motion estimation result is then obtained based on the initial motion estimation result and the updated motion estimation result.

Specifically, assuming "mv2_cost>cost2", a re-searching is performed with "mvp" as the starting point within the search space of size "d2", resulting in a new matching block. The relative position coordinates between the new matching block and the current block are calculated, denoted by "mv3", and the corresponding cost is denoted by "mv3_cost". Then, "mv2_cost" and "mv3_cost" are compared, and the smaller cost and its corresponding "mv" are used as the target motion estimation result. For example, if "mv3_cost" is less than "mv2_cost", the target motion estimation result includes: "mv3" and "mv3_cost".

In this way, suitable target motion estimation results can be obtained under different circumstances.

Based on the above application scenario, the present disclosure also provides the following embodiments.

Figure 4:
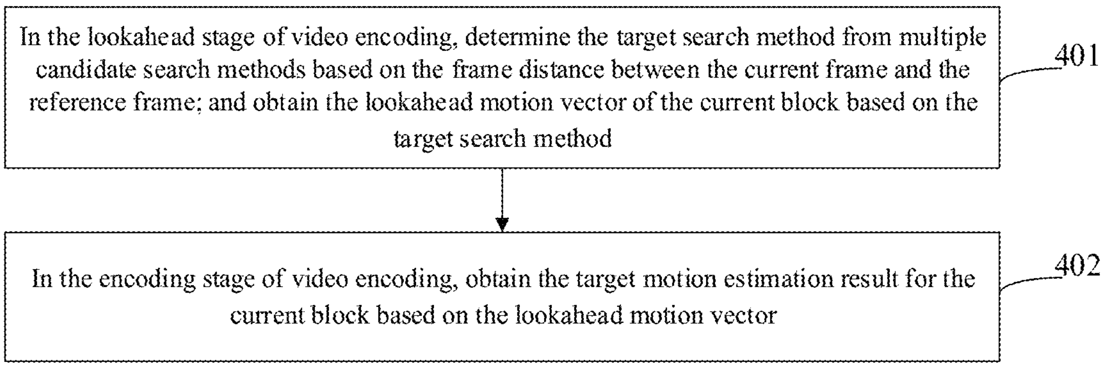
FIG. 4 is a schematic diagram according to the second embodiment of the present disclosure.

FIG. 4 is a schematic diagram according to the second embodiment of the present disclosure. The present embodiment provides a method for motion estimation, which includes:

401. In the lookahead stage of video encoding, it determines the target search method from multiple candidate search methods based on the frame distance between the current frame and the reference frame; and it obtains the lookahead motion vector of the current block based on the target search method.

402. In the encoding stage of video encoding, it obtains the target motion estimation result for the current block based on the lookahead motion vector.

In the lookahead stage, assuming that there are two candidate search methods, specifically the STAR search algorithm and the Hexagonal (HEX) search algorithm. The STAR search algorithm is an algorithm used for motion estimation, which belongs to a search method in video encoding technology. The STAR search algorithm combines the advantages of full search and diamond search by selectively searching specific regions, reducing computational complexity and improving search efficiency. The HEX Search Algorithm searches for the best matching block by performing a hexagonal pattern search within the search area, thereby reducing computational complexity and improving search efficiency.

Figure 5:
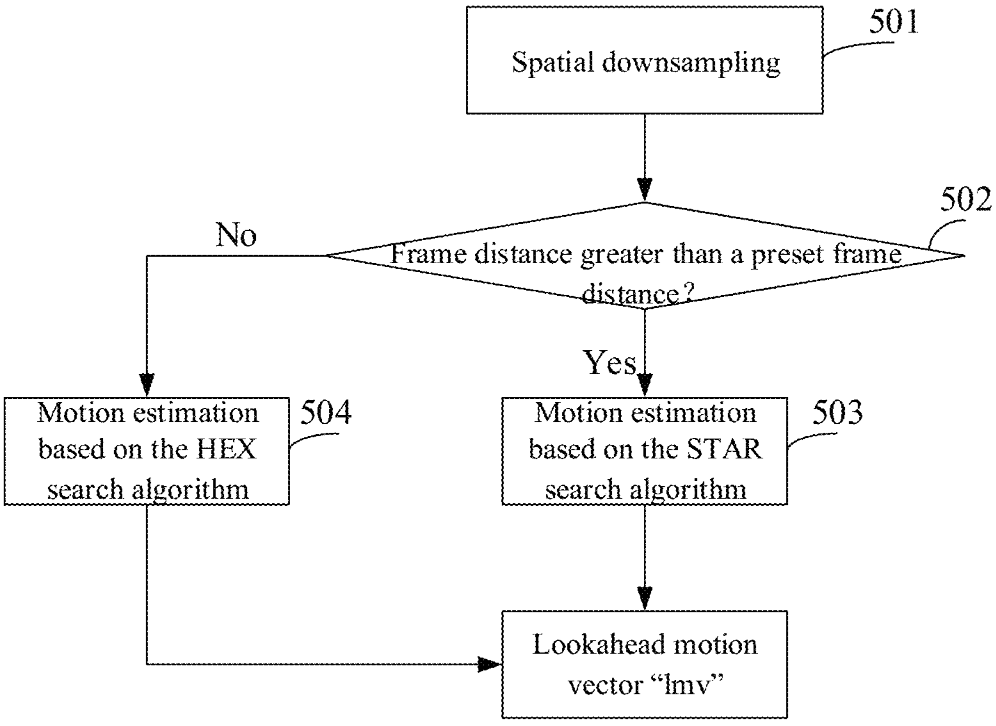
FIG. 5 is a schematic diagram of the motion estimation process in the lookahead stage provided according to the embodiments of the present disclosure.

FIG. 5 is a schematic diagram of the motion estimation process in the lookahead stage provided according to the embodiments of the present disclosure.

As shown in FIG. 5, the method includes the steps of:

501. Performing spatial downsampling on the current frame and the reference frame.

502. Determining whether the frame distance between the current frame and the reference frame is greater than a preset frame distance. If yes, execute the step 503; otherwise, execute the step 504.

The frame distance can be represented by the difference in sequence number between the current frame and the reference frame. For example, if the current frame is the t-th frame and the reference frame is the (t−2)-th frame, the frame distance is 2.

503. Performing motion estimation on the spatially down-sampled current frame and reference frame based on the STAR search algorithm, to obtain the lookahead motion vector "lmv".

504. Performing motion estimation on the spatially down-sampled current frame and reference frame based on the HEX search algorithm, to obtain the lookahead motion vector "lmv".

Due to the larger search range of the STAR search algorithm, it is possible to perform searches over a wider range and improve reliability when the frame distance is large; When the frame distance is small, using the HEX search algorithm can improve search efficiency, thereby enhancing encoding efficiency.

In the present embodiment, in the lookahead stage, by determining the target search method from multiple candidate search methods and obtaining the lookahead motion vector based on the target search method, the accuracy of the lookahead motion vector can be improved, thereby improving the accuracy of motion estimation in the encoding stage and enhancing the video encoding effect.

Figure 6:
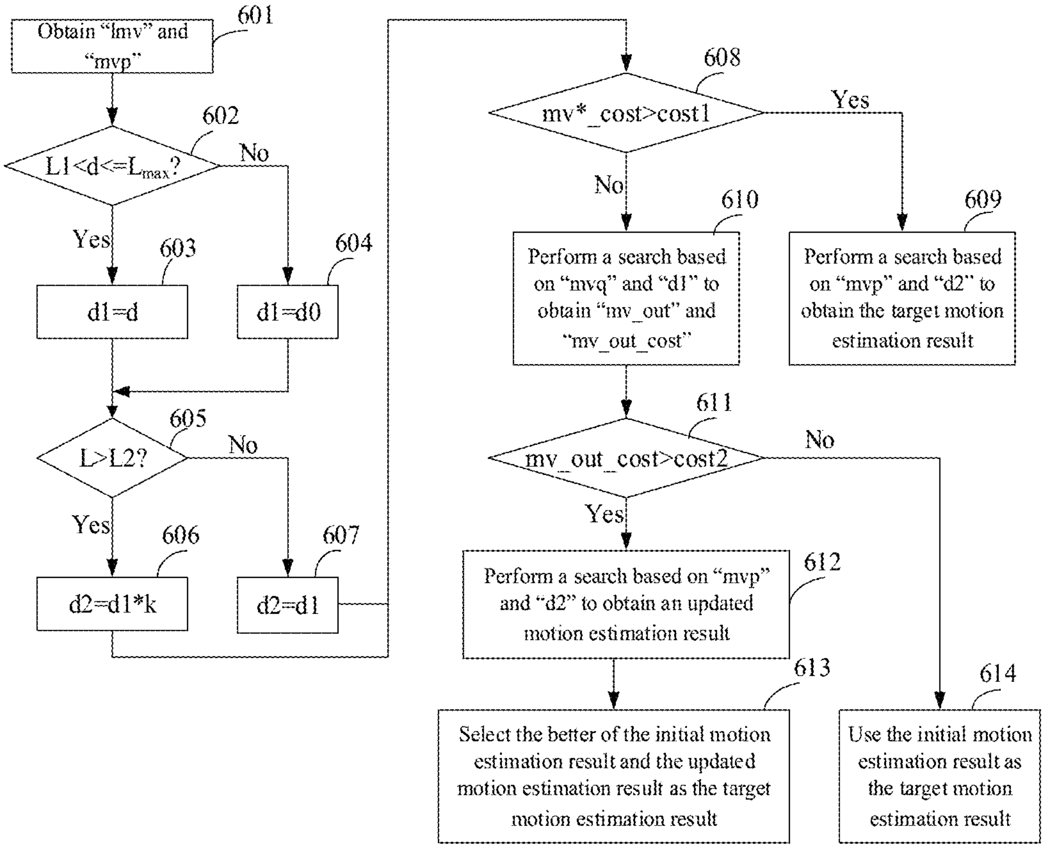
FIG. 6 is a schematic diagram of the motion estimation process in the encoding stage provided according to the embodiments of the present disclosure.

FIG. 6 is a schematic diagram of the motion estimation process in the encoding stage provided according to the embodiments of the present disclosure.

As shown in FIG. 6, the method includes the steps of:

601. Obtaining the lookahead motion vector "lmv" and the predicted search starting point "mvp" of the current block.

The lookahead motion vector "lmv" is obtained in the lookahead stage. The predicted search starting point "mvp" is determined based on the candidate motion vectors "mv". The specific process of obtaining "lmv" and "mvp" can be referred to in the relevant descriptions above.

602. Determining whether the distance "d" between the vector corresponding to "lmv" and the vector corresponding to "mvp" is greater than the first length threshold "L1" and less than or equal to the maximum range threshold "L max". If yes, execute the step 603; otherwise, execute the step 604.

603. Using the distance "d" as the first search range value, denoted as "d1=d".

604. Using the preset initial search range value "d0" as the first search range value, denoted as "d1=d0".

The specific calculation process for the first search range value "d1" can be referred to in the relevant descriptions above.

In this way, by obtaining the first search range value "d1" in step 603 or 604, the search space corresponding to the first search range value is used as the first search space.

In the present embodiment, the distance between the lookahead motion vector and the vector corresponding to the predicted search starting point, or the initial search range value, is used as the first search range value. This allows for adaptive adjustment of the first search space, thereby achieving an accurate target motion estimation result with high efficiency and improving the effect of motion estimation.

605. Determining whether the length "L" corresponding to "lmv" is greater than the second length threshold "L2". If yes, execute the step 606; otherwise, execute the step 607.

606. Using the preset multiple "k" of the first search range value as the second search range value, denoted as "d2=d1*k".

607. Using the first search range value as the second search range value, denoted as "d2=d1".

The specific calculation process for the second search range value "d2" can be referred to in the relevant descriptions above.

In this way, by obtaining the second search range value "d2" in step 607 or 608, the search space corresponding to the second search range value is used as the second search space.

In the present embodiment, the preset multiple of the first search range value or the first search range value itself is used as the second search range value. This allows for adaptive adjustment of the second search space, thereby achieving an accurate target motion estimation result with high efficiency and improving the effect of motion estimation.

608. Obtaining the optimal motion vector "mv*" based on the "lmv" and the candidate motion vector "mv", and obtaining the cost of the optimal motion vector, denoted as "mv*_cost". Afterward, determining whether "mv*_cost" is greater than the preset first cost threshold "cost1". If yes, execute the step 609; otherwise, execute the step 610.

609. Performing a search based on "mvp" and "d2" to obtain the target motion estimation result.

Specifically, it uses "mvp" as the target search starting point and the second search space as the target search space. It performs a search based on the target search starting point and the target search space to obtain the initial motion estimation result for the current block, which is then used as the target motion estimation result for the current block.

In the present embodiment, when the cost of the optimal motion vector is greater than the first cost threshold, a search is performed based on "mvp" in the larger second search space, which can improve the accuracy of the target motion estimation result.

610. Performing a search based on "mvq" and "d1" to obtain "mv_out" and "mv_out_cost".

Specifically, it uses the position point "mvq" corresponding to the optimal motion vector as the target search starting point and the first search space as the target search space. It performs a search based on the target search starting point and the target search space to obtain the initial motion estimation result for the current block, denoted as "mv_out" and "mv_out_cost".

611. Determining whether "mv_out_cost" is greater than the preset second cost threshold "cost2". If yes, execute the step 612; otherwise, execute the step 614.

612. Performing a search based on "mvp" and "d2" to obtain an updated motion estimation result.

Specifically, it uses "mvp" as the target search starting point and the second search space as the target search space, a new matching block for the current block is obtained based on the new search starting point and the new search space, and the updated motion estimation result is obtained based on the new matching block, represented by "mv_out'" and "mv_out_comt'".

613. Selecting the better of the initial motion estimation result and the updated motion estimation result as the target motion estimation result.

Specifically, the result with the smaller cost is selected as the better one. For example, if "mv_out_cost'" is less than "mv_out_cost", the target motion estimation result includes "mv_out'" and "mv_out_cost'".

In the present embodiment, when the cost of the initial motion vector is greater than the second cost threshold, re-searching is performed to obtain an updated motion estimation result. The target motion estimation result is then obtained based on the initial motion estimation result and the updated motion estimation result, which can improve the accuracy of the target motion estimation result.

614. Using the initial motion estimation result as the target motion estimation result.

Specifically, the target motion estimation result includes "mv_out" and "mv_out_cost".

In the present embodiment, when the cost of the initial motion vector is less than or equal to the second cost threshold, the initial motion estimation result obtained by searching based on "mvq" and "d1" is used as the target motion estimation result, which can improve the efficiency of motion estimation.

Figure 7:
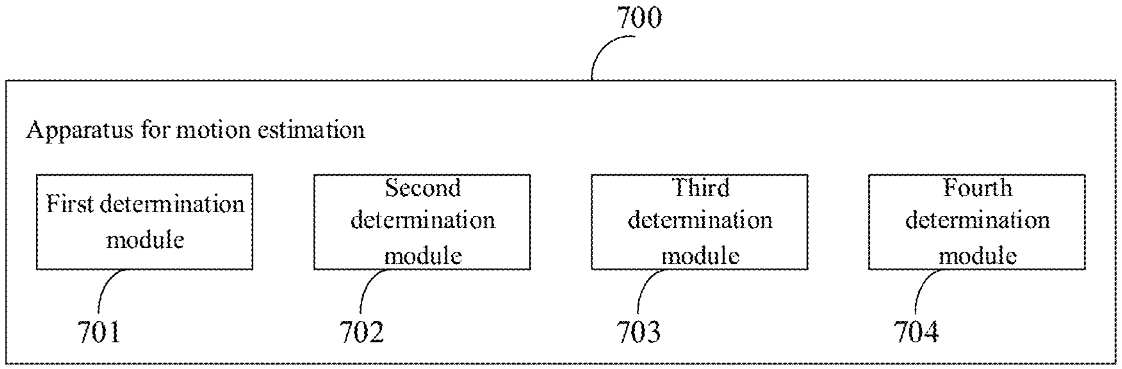
FIG. 7 is a schematic diagram according to the third embodiment of the present disclosure.

FIG. 7 is a schematic diagram according to the third embodiment of the present disclosure. The present embodiment provides an apparatus 700 for motion estimation. The apparatus 700 includes: a first determination module 701, a second determination module 702, a third determination module 703, and a fourth determination module 704.

The first determination module 701 is used to determine candidate search spaces and candidate search starting points based on a lookahead motion vector and a predicted search starting point of a current block. The second determination module 702 is used to determine a target search starting point from the candidate search starting points and determining a target search space from the candidate search spaces. The third determination module 703 is used to perform a search based on the target search starting point and the target search space to obtain an initial motion estimation result of the current block. The fourth determination module 704 is used to obtain a target motion estimation result for the current block based on the initial motion estimation result.

In the present embodiment, the candidate search spaces and the candidate search starting points are determined based on the lookahead motion vector and the predicted search starting point. The target search starting point is determined from the candidate search starting points, and the target search space is determined from the candidate search spaces. In this way, the lookahead motion vector is referenced during the motion estimation process, which improves the accuracy of the target search space and the target search starting point, and enhances the effects of motion estimation accordingly.

In some embodiments, the first determination module 701 is further used to:

Determine a first search space based on the lookahead motion vector and the predicted search starting point; Determine a second search space based on the lookahead motion vector and the first search space; Use the first search space and the second search space as the candidate search space.

In the present embodiment, the first search space is determined based on the lookahead motion vector and the predicted search starting point, and the second search space is determined based on the first search space and the lookahead motion vector. Multiple candidate search spaces can be obtained, and an accurate target search space can be determined based on the candidate search spaces, thereby improving motion estimation performance.

In some embodiments, the first determination module 701 is further used to:

If the distance between the lookahead motion vector and the vector corresponding to the predicted search starting point is greater than a first length threshold and less than or equal to a maximum range threshold, use the distance as the first search range value; Determine the first length threshold based on a preset initial search range value; If the distance is less than or equal to the first length threshold, use the initial search range value as the first search range value; Use the search space corresponding to the first search range value as the first search space.

In the present embodiment, the distance between the lookahead motion vector and the vector corresponding to the predicted search starting point, or the initial search range value, is used as the first search range value. This allows for adaptive adjustment of the first search space, thereby achieving an accurate target motion estimation result with high efficiency and improving the effect of motion estimation.

In some Embodiments, the first determination module 701 is further used to:

If the length corresponding to the lookahead motion vector is greater than a second length threshold, use the preset multiple of the first search range value of the first search space as the second search range value; Determine the second length threshold based on the first search range value; If the length corresponding to the lookahead motion vector is less than or equal to the second length threshold, use the first search range value as the second search range value; Use the search space corresponding to the second search range value as the second search space.

In the present embodiment, the preset multiple of the first search range value or the first search range value itself is used as the second search range value. This allows for adaptive adjustment of the second search space, thereby achieving an accurate target motion estimation result with high efficiency and improving the effect of motion estimation.

In some embodiments, the first determination module 701 is further used to:

Determine the optimal motion vector based on the lookahead motion vector and the candidate motion vector corresponding to the predicted search starting point; Use the predicted search starting point and the position point corresponding to the optimal motion vector as the candidate search starting point.

In the present embodiment, the predicted search starting point and the position point corresponding to the optimal motion vector are used as the candidate search starting points. In the subsequent process, a suitable starting point can be selected as the target search starting point according to the specific situation, thereby improving the accuracy of the target search starting point and enhancing the accuracy of motion estimation.

In some embodiments, the third determination module 703 is further used to:

If the cost of the optimal motion vector is greater than a preset first cost threshold, use the predicted search starting point as the target search starting point and use the second search space as the target search space.

The fourth determination module 704 is further used to:

Use the initial motion estimation result as the target motion estimation result.

In the present embodiment, when the cost of the optimal motion vector is greater than the first cost threshold, a search is performed based on "mvp" in the larger second search space, which can improve the accuracy of the target motion estimation result.

In some embodiments, the third determination module 703 is further used to:

If the cost of the optimal motion vector is less than or equal to a preset first cost threshold, use the position point corresponding to the optimal motion vector as the target search starting point and use the first search space as the target search space.

In some embodiments, the initial motion estimation result includes the cost of the initial motion vector.

The fourth determination module 704 is further used to:

If the cost of the initial motion vector is greater than a preset second cost threshold, perform a search based on the predicted search starting point and the second search space to obtain an updated motion estimation result; obtain the target motion estimation result based on the initial motion estimation result and the updated motion estimation result; or If the cost of the initial motion vector is less than or equal to the preset second cost threshold, use the initial motion estimation result as the target motion estimation result.

In the present embodiment, when the cost of the initial motion vector is greater than the second cost threshold, a re-searching is performed to obtain the updated motion estimation result. The target motion estimation result is then obtained based on the initial motion estimation result and the updated motion estimation result, which can improve the accuracy of the target motion estimation result.

In the present embodiment, when the cost of the initial motion vector is less than or equal to the second cost threshold, the initial motion estimation result obtained by searching based on "mvq" and "d1" is used as the target motion estimation result, which can improve the efficiency of motion estimation.

It is understood that in the embodiments of the present disclosure, the same or similar content in different embodiments can be mutually referenced.

It is understood that terms such as "first" and "second" in the embodiments of the present disclosure are only used for distinguishing and do not indicate the level of importance or the order of sequence.

It is understood that the sequence of steps involved in the processes, unless otherwise specified, indicates that the temporal relationship between these steps is not limited.

The technical solutions of the present disclosure involve the collection, storage, use, processing, transmission, provision, and disclosure of user personal information, all of which comply with relevant laws and regulations and do not violate public order and good customs.

Embodiments of the present disclosure also provide an electronic device, a readable storage medium, and a computer program product.

Figure 8:
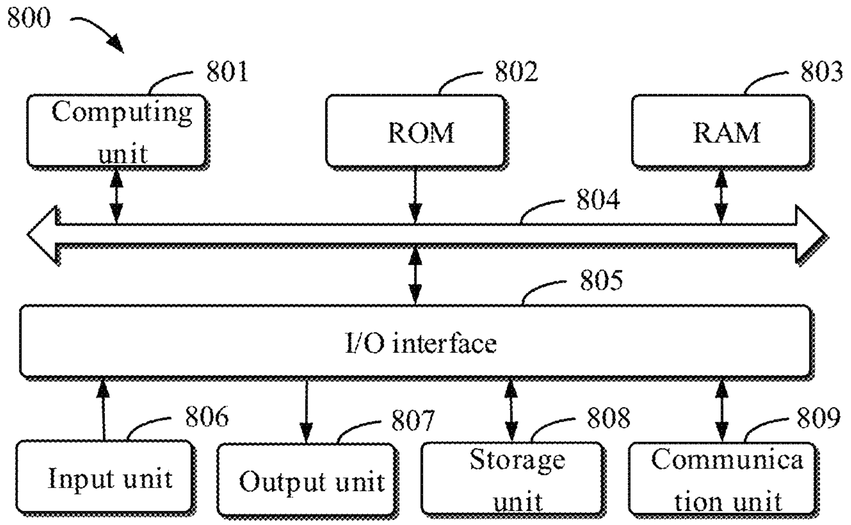
FIG. 8 is a schematic diagram of an electronic device for implementing the motion estimation method according to the embodiments of the present disclosure.

FIG. 8 shows a schematic block diagram of an example electronic device 800 that can be used to implement embodiments of the present disclosure. Electronic device 800 is intended to represent various forms of digital computers, such as laptops, desktop computers, workstations, servers, blade servers, mainframes, and other suitable computers. The electronic device can also represent various forms of mobile devices, such as personal digital assistants, cellular phones, smartphones, wearable devices and other similar computing devices. The components shown here, their connections and relationships, and their functions are meant merely as examples, and are not intended to limit implementations of the present disclosure described and/or claimed in this document.

As shown in FIG. 8, electronic device 800 includes a computing unit 801, which can execute various appropriate actions and processes according to computer programs stored in read-only memory (ROM) 902 or loaded into random access memory (RAM) 803 from storage unit 808. Various programs and data needed for electronic device 800's operation can also be stored in RAM 803. Computing unit 801, ROM 802, and RAM 803 are interconnected via bus 804. An input/output (I/O) interface 805 is also connected to bus 804.

Multiple components in electronic device 800 are connected to I/O interface 805, including: input unit 806, such as keyboard, mouse, etc.; output unit 807, such as various types of displays, speakers, etc.; storage unit 808, such as magnetic disks, optical discs, etc.; and communication unit 809, such as network cards, modems, wireless communication transceivers, etc. Communication unit 809 allows electronic device 800 to exchange information/data with other devices through computer networks such as the Internet and/or various telecommunication networks.

Computing unit 801 can be various general and/or specialized processing components with processing and computing capabilities. Some examples of computing unit 801 include but are not limited to central processing units (CPU), graphics processing units (GPU), various specialized artificial intelligence (AI) computing chips, various computing units running machine learning model algorithms, digital signal processors (DSP), and any suitable processors, controllers, microcontrollers, etc. Computing unit 801 executes the various methods and processes described above, such as model generation methods or data processing methods. For example, in some embodiments, the model generation method or data processing method can be implemented as computer software programs that are tangibly embodied in machine-readable media, such as storage unit 808. In some embodiments, part or all of the computer program can be loaded and/or installed onto electronic device 800 via ROM 802 and/or communication unit 809. When the computer program is loaded into RAM 803 and executed by computing unit 801, one or more steps of the model generation method or data processing method described above can be executed. Alternatively, in other embodiments, computing unit 801 can be configured to execute the model generation method or data processing method through any other suitable means (for example, through firmware).

Various implementations of the systems and techniques described in this document can be realized in digital electronic circuitry, integrated circuitry, field programmable gate arrays (FPGAs), application specific integrated circuits (ASICs), application specific standard products (ASSPs), system on chip (SoC), complex programmable logic devices (CPLDs), computer hardware, firmware, software, and/or combinations of these. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Program code for implementing methods of the present disclosure can be written in any combination of one or more programming languages. These program codes can be provided to processors or controllers of general-purpose computers, special-purpose computers, or other programmable task processing devices, such that when executed by the processor or controller, they implement the functions/operations specified in the flowcharts and/or block diagrams. The program code can execute entirely on the machine, partly on the machine, partly on the machine as a standalone software package and partly on a remote machine, or entirely on the remote machine or server.

In the context of the present disclosure, a machine-readable medium can be a tangible medium that can contain or store a program for use by or in connection with an instruction execution system, apparatus, or device. The machine-readable medium can be a machine-readable signal medium or a machine-readable storage medium. The machine-readable medium can include, but is not limited to, electronic, magnetic, optical, electromagnetic, infrared, or semiconductor systems, apparatus, or devices, or any suitable combination thereof. More specific examples of machine-readable storage media would include an electrical connection based on one or more wires, a portable computer diskette, a hard disk, random access memory (RAM), read-only memory (ROM), erasable programmable read-only memory (EPROM or Flash memory), optical fiber, portable compact disc read-only memory (CD-ROM), optical storage devices, magnetic storage devices, or any suitable combination thereof.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in computing systems that include back-end components (e.g., as data servers), or that include middleware components (e.g., application servers), or that include front-end components (e.g., user computers with graphical user interfaces or web browsers through which users can interact with implementations of the systems and techniques described here), or any combination of such back-end, middleware, or front-end components. The components of the system can be interconnected by any form or medium of digital data communication (e.g., a communication network). Examples of communication networks include local area network (LAN), wide area network (WAN), and the Internet.

The computer system can include clients and servers. A client and server are generally remote from each other and typically interact through a communication network. The relationship of client and server arises by virtue of computer programs running on the respective computers and having a client-server relationship to each other. The server can be a cloud server, also known as a cloud computing server or cloud host, which is a host product in the cloud computing service system, solving the difficulties in management and weak business scalability that exist in traditional physical hosts and VPS services ("Virtual Private Server" or "VPS" for short). The server can also be a distributed system server, or a server integrated with blockchain.

It should be understood that various forms of processes shown above can be used, with steps being reordered, added, or removed. For example, the steps recorded in the present disclosure can be executed in parallel or in sequence or in different orders, as long as they can achieve the desired results of the technical solutions disclosed in this document, which is not limited herein.

The above specific embodiments do not constitute limitations on the protection scope of the present disclosure. Those skilled in the art should understand that various modifications, combinations, sub-combinations and substitutions can be made according to design requirements and other factors. Any modifications, equivalent replacements, and improvements made within the spirit and principles of the present disclosure should be included within the protection scope of the present disclosure.

What is claimed is:

1. A method for motion estimation, comprising:

determining candidate search spaces and candidate search starting points based on a lookahead motion vector and a predicted search starting point of a current block;

determining a target search starting point from the candidate search starting points and determining a target search space from the candidate search spaces;

performing a search based on the target search starting point and the target search space to obtain an initial motion estimation result for the current block;

obtaining a target motion estimation result for the current block based on the initial motion estimation result, wherein determining the candidate search spaces based on the lookahead motion vector and the predicted search starting point of the current block comprises:

determining a first search space based on the lookahead motion vector and the predicted search starting point;

determining a second search space based on the lookahead motion vector and the first search space;

using the first search space and the second search space as the candidate search spaces, wherein determining the first search space based on the lookahead motion vector and the predicted search starting point comprises:

if a distance between the lookahead motion vector and a vector corresponding to the predicted search starting point is greater than a first length threshold and less than or equal to a maximum range threshold, using the distance as a first search range value, wherein the first length threshold is determined based on a preset initial search range value;

if the distance is less than or equal to the first length threshold, using the initial search range value as the first search range value;

using a search space corresponding to the first search range value as the first search space.

2. The method of claim 1, wherein determining the second search space based on the lookahead motion vector and the first search space comprises:

if a length corresponding to the lookahead motion vector is greater than a second length threshold, using a preset multiple of the first search range value of the first search space as a second search range value, wherein the second length threshold is determined based on the first search range value;

if the length corresponding to the lookahead motion vector is less than or equal to the second length threshold, using the first search range value as the second search range value;

using a search space corresponding to the second search range value as the second search space.

3. The method of claim 1, wherein determining candidate search starting points based on the lookahead motion vector and the predicted search starting point of the current block comprises:

determining an optimal motion vector based on the lookahead motion vector and a candidate motion vector corresponding to the predicted search starting point;

using the predicted search starting point and a position point corresponding to the optimal motion vector as the candidate search starting points.

4. The method of claim 3, wherein:

determining the target search starting point from the candidate search starting points and determining the target search space from the candidate search spaces comprises:

if a cost of the optimal motion vector is greater than a preset first cost threshold, using the predicted search starting point as the target search starting point and using the second search space as the target search space;

obtaining the target motion estimation result for the current block based on the initial motion estimation result comprises:

using the initial motion estimation result as the target motion estimation result.

5. The method of claim 3, wherein:

determining the target search starting point from the candidate search starting points and determining the target search space from the candidate search spaces comprises:

if a cost of the optimal motion vector is less than or equal to a preset first cost threshold, using a position point corresponding to the optimal motion vector as the target search starting point and using the first search space as the target search space;

the initial motion estimation result comprises a cost of an initial motion vector;

obtaining the target motion estimation result for the current block based on the initial motion estimation result comprises:

if the cost of the initial motion vector is greater than a preset second cost threshold, performing a search based on the predicted search starting point and the second search space to obtain an updated motion estimation result; obtaining the target motion estimation result based on the initial motion estimation result and the updated motion estimation result; or if the cost of the initial motion vector is less than or equal to the preset second cost threshold, using the initial motion estimation result as the target motion estimation result.

6. The method of claim 1, further comprising:

determining a target search method from multiple candidate search methods based on a frame distance between a current frame and a reference frame in the lookahead stage of video encoding;

obtaining the lookahead motion vector based on the target search method.

7. An electronic device, comprising:

at least one processor; and a memory communicatively connected with the at least one processor;

wherein the memory stores instructions executable by the at least one processor, and the instructions are executed by the at least one processor to enable the at least one processor to perform a method for motion estimation, wherein the method for motion estimation comprises:

determining candidate search spaces and candidate search starting points based on a lookahead motion vector and a predicted search starting point of a current block;

determining a target search starting point from the candidate search starting points and determining a target search space from the candidate search spaces;

performing a search based on the target search starting point and the target search space to obtain an initial motion estimation result for the current block;

obtaining a target motion estimation result for the current block based on the initial motion estimation result, wherein determining the candidate search spaces based on the lookahead motion vector and the predicted search starting point of the current block comprises:

determining a first search space based on the lookahead motion vector and the predicted search starting point;

determining a second search space based on the lookahead motion vector and the first search space;

using the first search space and the second search space as the candidate search spaces, wherein determining the first search space based on the lookahead motion vector and the predicted search starting point comprises:

if a distance between the lookahead motion vector and a vector corresponding to the predicted search starting point is greater than a first length threshold and less than or equal to a maximum range threshold, using the distance as a first search range value, wherein the first length threshold is determined based on a preset initial search range value;

if the distance is less than or equal to the first length threshold, using the initial search range value as the first search range value;

using a search space corresponding to the first search range value as the first search space.

8. The electronic device of claim 7, wherein determining the second search space based on the lookahead motion vector and the first search space comprises:

if a length corresponding to the lookahead motion vector is greater than a second length threshold, using a preset multiple of the first search range value of the first search space as a second search range value, wherein the second length threshold is determined based on the first search range value;

if the length corresponding to the lookahead motion vector is less than or equal to the second length threshold, using the first search range value as the second search range value;

using a search space corresponding to the second search range value as the second search space.

9. The electronic device of claim 7, wherein determining candidate search starting points based on the lookahead motion vector and the predicted search starting point of the current block comprises:

determining an optimal motion vector based on the lookahead motion vector and a candidate motion vector corresponding to the predicted search starting point;

using the predicted search starting point and a position point corresponding to the optimal motion vector as the candidate search starting points.

10. The electronic device of claim 9, wherein determining the target search starting point from the candidate search starting points and determining the target search space from the candidate search spaces comprises:

if a cost of the optimal motion vector is greater than a preset first cost threshold, using the predicted search starting point as the target search starting point and using the second search space as the target search space;

obtaining the target motion estimation result for the current block based on the initial motion estimation result comprises:

using the initial motion estimation result as the target motion estimation result.

11. The electronic device of claim 9, wherein determining the target search starting point from the candidate search starting points and determining the target search space from the candidate search spaces comprises:

if a cost of the optimal motion vector is less than or equal to a preset first cost threshold, using a position point corresponding to the optimal motion vector as the target search starting point and using the first search space as the target search space;

the initial motion estimation result comprises a cost of an initial motion vector;

obtaining the target motion estimation result for the current block based on the initial motion estimation result comprises:

if the cost of the initial motion vector is greater than a preset second cost threshold, performing a search based on the predicted search starting point and the second search space to obtain an updated motion estimation result; obtaining the target motion estimation result based on the initial motion estimation result and the updated motion estimation result; or if the cost of the initial motion vector is less than or equal to the preset second cost threshold, using the initial motion estimation result as the target motion estimation result.

12. The electronic device of claim 7, further comprising:

determining a target search method from multiple candidate search methods based on a frame distance between a current frame and a reference frame in the lookahead stage of video encoding;

obtaining the lookahead motion vector based on the target search method.

13. A non-transitory computer readable storage medium with computer instructions stored thereon, wherein the computer instructions are used for causing a method for motion estimation, wherein the method for motion estimation comprises:

determining candidate search spaces and candidate search starting points based on a lookahead motion vector and a predicted search starting point of a current block;

determining a target search starting point from the candidate search starting points and determining a target search space from the candidate search spaces;

performing a search based on the target search starting point and the target search space to obtain an initial motion estimation result for the current block;

obtaining a target motion estimation result for the current block based on the initial motion estimation result, wherein determining the candidate search spaces based on the lookahead motion vector and the predicted search starting point of the current block comprises:

determining a first search space based on the lookahead motion vector and the predicted search starting point;

determining a second search space based on the lookahead motion vector and the first search space;

using the first search space and the second search space as the candidate search spaces, wherein determining the first search space based on the lookahead motion vector and the predicted search starting point comprises:

if a distance between the lookahead motion vector and a vector corresponding to the predicted search starting point is greater than a first length threshold and less than or equal to a maximum range threshold, using the distance as a first search range value, wherein the first length threshold is determined based on a preset initial search range value;

if the distance is less than or equal to the first length threshold, using the initial search range value as the first search range value;

using a search space corresponding to the first search range value as the first search space.

14. The non-transitory computer readable storage medium of claim 13, wherein determining the second search space based on the lookahead motion vector and the first search space comprises:

if a length corresponding to the lookahead motion vector is greater than a second length threshold, using a preset multiple of the first search range value of the first search space as a second search range value, wherein the second length threshold is determined based on the first search range value;

if the length corresponding to the lookahead motion vector is less than or equal to the second length threshold, using the first search range value as the second search range value;

using a search space corresponding to the second search range value as the second search space.

* * * * *